F. G. Ford,
Furniture Caster.
N° 47,007.    Patented Mar. 28, 1865.
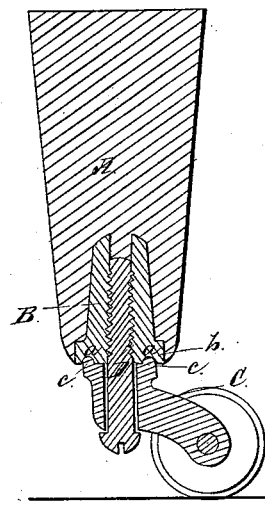
Fig. 1.
Fig. 2.'
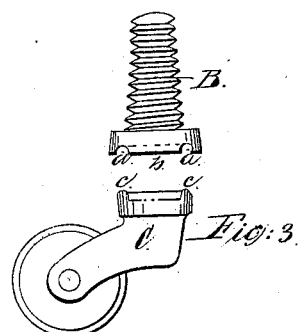
Fig. 2.    Fig. 3.
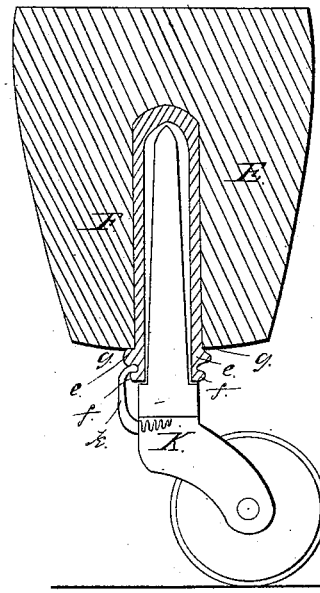
Fig. 4.
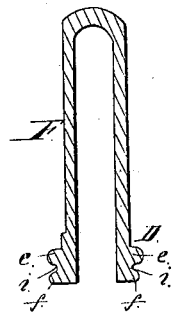
Fig. 5.
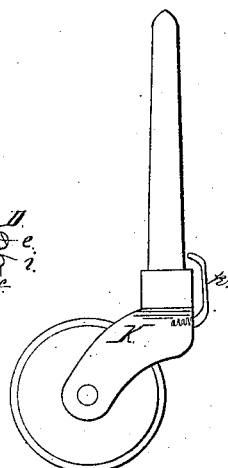
Fig. 6.
Witnesses:
J. B. Woodruff
Edw. F. Brown
Inventor:
Frederic G. Ford

UNITED STATES PATENT OFFICE.

FREDERIC G. FORD, OF WASHINGTON, DISTRICT OF COLUMBIA.

IMPROVED CASTER FOR FURNITURE.

Specification forming part of Letters Patent No. 47,007, dated March 28, 1865.

*To all whom it may concern:*

Be it known that I, FREDERIC G. FORD, of the city of Washington, in the District of Columbia, have invented certain new and useful improvements in furniture-casters and the manner of securing the same to all kinds of furniture; and I do hereby declare that the following is a full and exact description of the same, reference being had to the accompanying drawings, making a part of this specification.

Figure 1 represents a section through one of my improved casters. Figs. 2, 2' show a socket for fastening the caster, side and end view detached. Fig. 3 is the step and caster detached.

My invention consists in the construction of sockets or tubes to be fitted into their places so as to remain firmly, and the mode of securing the casters to their sockets, so that they will remain snugly in their places or can be easily removed when desired.

To enable others skilled in the art to make and use my improvements, I will describe them in detail, referring to the drawings and the letters marked thereon.

A in Fig. 1 is the leg, into which the socket or tube B may be fitted so as to be driven in tight; or the tube B may have a screw-thread, as seen in Fig. 2, the disk $b$ being even with the bottom of the leg, it having a circular recess, $a\ a$, in its face, into which a corresponding projecting ring, $c\ c$, on the swivel C is fitted, so that the weight is upon the disk, and the caster keeps its place centrally with comparatively little strain on the screw D, which forms the pivot, and at the same time secures the caster firmly to the furniture without the aid of other screws or fastenings.

The advantages of my improved casters are, that they can be made and fitted to any description of furniture as cheap as any other known or used; that they are easily put in or taken out, and not liable to fall out, be broken, or lost, and consequently more durable, so that housekeepers may by their adoption be saved from the frequent annoyance of a broken or lost caster when moving or cleaning house.

Having thus described my invention, what I claim as new, and desire to secure by Letters Patent, is—

The socket or tube B, with its circular recess $a\ a$ in the disk, and its corresponding projecting ring, $c\ c$, on the swivel C, in combination with the fastening-screw D, which forms the pivot, for the purposes herein set forth.

FREDERIC G. FORD.

Witnesses:
J. B. WOODRUFF,
EDM. F. BROWN.